Figure 3:
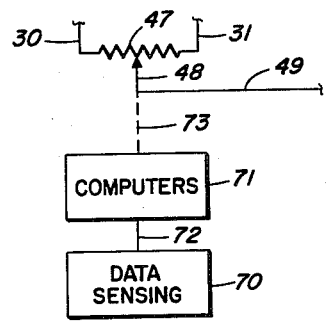

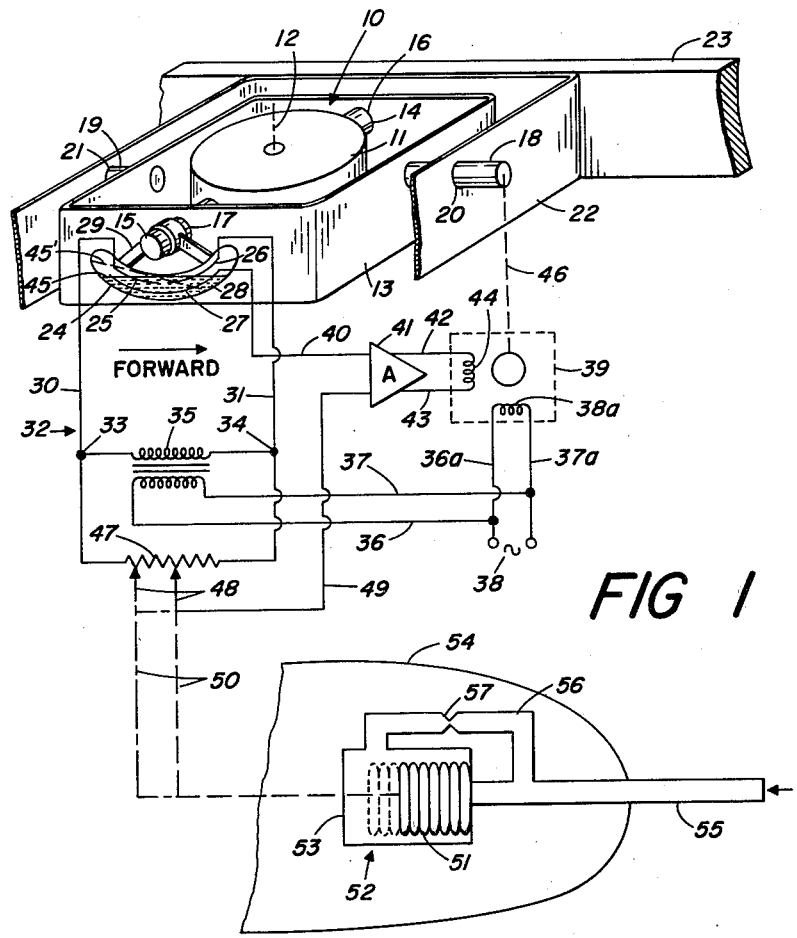
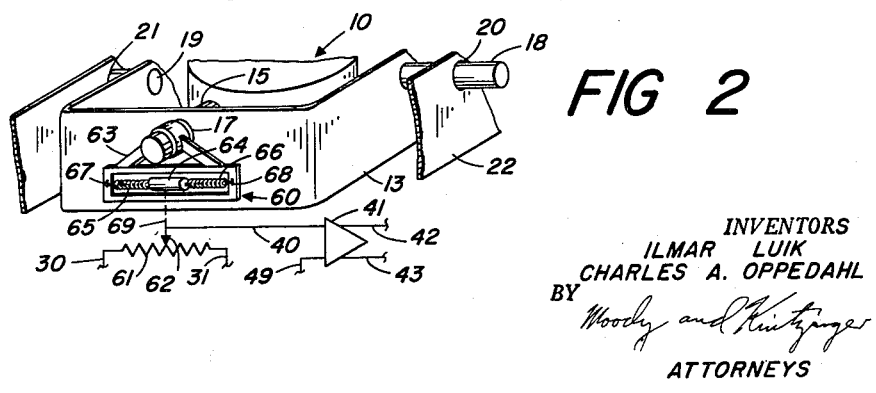
FIG 1
FIG 2
INVENTORS
ILMAR LUIK
CHARLES A. OPPEDAHL
BY
ATTORNEYS Dec. 8, 1964  I. LUIK ETAL  3,160,019
COMPENSATION FOR GYRO PITCH SIGNAL VELOCITY CHANGE ERRORS
Filed Dec. 19, 1960  2 Sheets-Sheet 2

INVENTORS
ILMAR LUIK
CHARLES A. OPPEDAHL
BY Moody and Kintzinger
ATTORNEYS

United States Patent Office 3,160,019
Patented Dec. 8, 1964

3,160,019
COMPENSATION FOR GYRO PITCH SIGNAL
VELOCITY CHANGE ERRORS
Ilmar Luik and Charles A. Oppedahl, Cedar Rapids, Iowa, assignors to Collins Radio Company, Cedar Rapids, Iowa, a corporation of Iowa
Filed Dec. 19, 1960, Ser. No. 76,970
7 Claims. (Cl. 74—5.47)

This invention relates to gyroscope control systems for vehicles, particularly aircraft, and is particularly concerned with gyro pitch signal indications and compensation for velocity change created errors in such signals.

Vertical gyros, as used in autopilots and in other flight control systems, are generally slaved to gravity by use of pendulums, gravity sensing switches or potentiometers in various forms. Although this is fine for steady unaccelerated flight, problems are encountered during velocity changes, such as during take off when a fast plane may have forward acceleration as high as 6 feet per second$^2$ extending for as long as 2 minutes. Such an elapse of time is more than sufficient for significant gyro erection to false vertical in the pitch axis with such correction being called for by a pendulum or gravity sensing switch while in a pushed back state as imposed by forward acceleration of the aircraft. Such an error can become as high as 6° in response to such erroneous erection commands and could immediately thereafter control the aircraft to a corresponding nose down attitude. Some approaches to this problem have employed a switch to other reference devices for pitch control during velocity changes. Others have employed means for obtaining a derivative of air speed and for responding thereto to cut pitch erection completely off during velocity changes of any significant magnitude. Of course, this puts the gyro into an undesirable state of free drift during velocity changes.

Velocity change problems, such as set forth above, also occur with periodic accelerations and deaccelerations encountered with phugoid oscillations, a flight characteristic and a significant factor encountered with many aircraft. These phugoid oscillation forward accelerations and deaccelerations have much the same effect on gyros as takeoff acceleration and landing deacceleration. This is particularly undesirable because an automatic pilot responds to false gyro commands in such a manner, as a general rule, as to amplify phugoid oscillations.

It is, therefore, a principal object of this invention to compensate erroneous gyro pitch error signals that arise during aircraft forward velocity change.

Another object is to minimize gyro erection to false vertical in the pitch axis.

Features in the accomplishment of these objects are the provision of a velocity change sensing apparatus having a signal which is matched against the signal output of pitch sensing means for gyro pitch erection control. The pitch sensing device of such a gyro control system may be an electrolytic switch, an accelerometer, or a pendulum-synchro arrangement, the output of any of which may be balanced against the signal output of velocity change sensing apparatus such as a leaking bellows, data sensing and computing means, or a radio wave doppler system adapted for providing speed and velocity change signals.

Specific embodiments representing what are presently regarded as the best modes of carrying out the invention are illustrated in the accompanying drawings.

Figure 4:
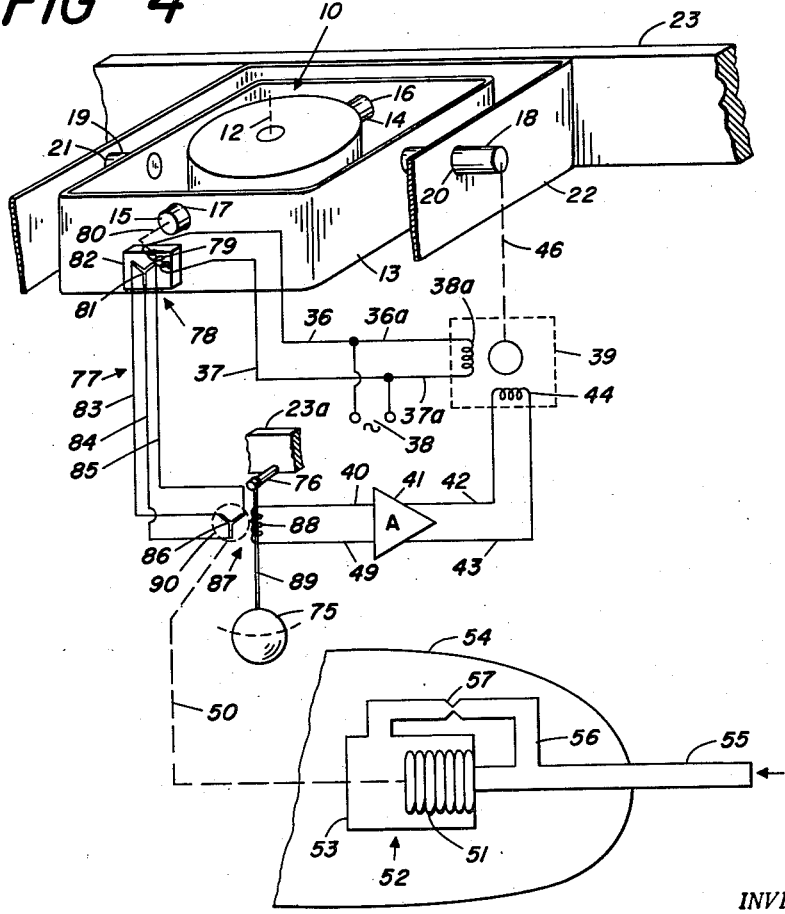

In the drawings:

FIG. 1 represents a fragmentary perspective view of a gyro equipped with a pitch sensing electrolytic switch and mounted in a plane, and a leaking bellows air speed signalling device interconnected for gyro pitch erection control by an erection system shown schematically;

FIG. 2, a fragmentary perspective view of a gyro equipped with a pitch indicating accelerometer;

FIG. 3, a partial schematic of a speed data sensing and speed change computing system; and FIG. 4, a fragmentary perspective view similar to FIG. 1 of a gyro with a pendulum and synchro pitch erection control system which may employ a velocity change signal from the leaking bellows shown or from a data sensing and computing system such as indicated by FIG. 3.

Referring to the drawings:

The gyroscope 10 of FIG. 1 has a rotatably mounted gyro wheel (not visible) incased within gyro housing 11 and which rotates about vertical axis 12. Gyro housing 11 is conveniently mounted for relative pitch movement with respect to roll gimbal 13 by trunnions 14 and 15 which are pivotally supported in openings 16 and 17 respectively of the gimbal 13. In turn roll gimbal 13 is pivotally mounted by trunnions 18 and 19 extending along a roll axis parallel to the path of aircraft motion as indicated by the forward arrow and rotatably supported in openings 20 and 21 respectively of gyro frame 22 which is fixed to aircraft frame member 23. An electrolytic switch 24 of conventional construction having terminals 25 and 26, the equivalent of a center tap 27, and having electrolytic fluid 28, is fixed to pitch trunnion 15 by bracket 29.

Electrolytic switch 24 is in effect a gravity sensing potentiometer with terminals 25 and 26 connected through lines 30 and 31 respectively of network 32 to the output terminals 33 and 34 of transformer 35. This transformer is advantageously fed through lines 36 and 37 from A.C. power source 38 which also supplies reference power A.C. through lines 36a and 37a to winding 38a of erection motor 39. The center tap 27 of electrolytic switch 24 is connected through line 40 to amplifier 41. The output of amplifier 41 is fed as a power A.C. signal through lines 42 and 43 to winding 44 of erection motor 39.

Electrolytic fluid 28 under the influence of gravity normally seeks the lowest position in switch 24 and presents a top surface 45 substantially horizontal as related to the earth and normal to the force of gravity. With this being the normal steady state of switch 24, and with gyro axis 12 remaining vertical, there will be no signal picked up by tap 27 and transmitted through line 40 such as to actuate amplifier 41 for driving erection motor 39. However, should axis 12 depart in gyro pitch from the vertical, for example, tilting to the rear, the electrolytic fluid 28 could then assume such a position in switch 24 as indicated by the phantom surface line 45′ which would then be the substantially horizontal surface of the fluid. With switch 24 tilted in pitch to this state there would be considerably less electrical resistance between terminal 25 and tap 27 than exists between terminal 26 and tap 27. This provides a signal from tap 27 through line 40 which may be employed for actuating amplifier 41 for power output and for giving the A.C. phase for output to winding 44 in establishing the direction and the torque output force of erection motor 39. Output drive is applied through a driving train 46 extending from motor 39 to a roll trunnion, such as trunnion 18, for applying gyro pitch erecting force according to well known laws in gyroscopic erection.

In such a gyro system employing an electrolytic switch 24, additional forces, acceleration and deacceleration, are encountered in vehicles, such as aircraft, which act to so shift electrolytic fluid 28 as to give erroneous pitch signals from tap 27. In order that this may be substantially counteracted or compensated for, a velocity change signaling potentiometer 47, of the resistive element type, is connected in network 32 between lines 30 and 31.

The movable tap 48 of potentiometer 47, which is connected by line 49 to amplifier 41, is advantageously driven by a drive train 50 extending from a velocity change indicating bellows 51. This bellows is part of a leaking bellows structure 52 with bellows 51 mounted within a chamber 53 which, in turn, is conveniently mounted within aircraft wing 54 in such a manner that tube 55 extends forwardly therefrom and forward from the wing to provide fluid passage to the interior of bellows 51.

The leak of the so-called leaking bellows 52 is provided by tubular passage means 56 equipped with a restrictive flow section or orifice 57. Thus, whenever the air velocity at the tube forward end changes, such as during velocity change of the aircraft, air impact pressure changes. This is accompanied by a corresponding increase or decrease in length of bellows 51 which is retained to some degree as long as there is differential pressure between chamber 53 and the interior of bellows 51, and until such time that this has become equalized by fluid flow through restriction 57. For example, with acceleration of the vehicle in the direction of the forward arrow as shown in FIG. 1, increased static pressure within bellows 51, while as yet unequaled by pressure in chamber 53, will expand the bellows, such as indicated in phantom. This acts to move drive train 50 and potentiometer tap 48 to corresponding positions also shown in phantom. At the same time the electrolytic fluid of switch 24 is pushed back by the force of acceleration to such a state as to present a surface position such as indicated by phantom line 45'. Of course, the degree of flow restriction is determined by the particular section or orifice 57 used. Care must be exercised in such choice keeping the flight characteristics and performance parameters of particular aircraft in mind in order to minimize gyro system pitch erection control errors arising during velocity changes.

Whenever the aircraft deaccelerates, such as during landing, bellows 51 would collapse to a degree in the opposite direction from the neutral balanced state condition shown in solid lines in FIG. 1 and drive train 50 moves tap 48 to the right. Simultaneously, electrolytic fluid 28, acted upon by forces of deacceleration, moves to the right and gives a false pitch signal through tap 27 as if the gyro vertical axis 12 had tilted forward.

With a leaking bellows 52 being used to provide a measure of velocity change by measuring changes in air impact pressure at the forward end of tube 55, it should be realized, that even though the aircraft maintains a constant speed but is involved in ascending to higher altitudes or conversely descending to lower altitudes, the variation in air density accompanying such altitude changes will give some erroneous indications of velocity change. However, fortunately the magnitude of the erroneous velocity change signals resulting with normally encountered flight maneuvers and altitude change is not serious. It should be also realized, although not shown in the drawings, that the gyro systems illustrated may be implemented for roll and pitch takeoff signals which would be used for either signal instrumentation and/or aircraft flight control as desired.

In the embodiment of FIG. 2 electrolytic switch 24 of FIG. 1 is replaced by accelerometer 60 and a potentiometer 61, of the resistive element type, which is connected in network 32 between lines 30 and 31. The movable tap 62 of potentiometer 61 and which replaces tap 27 of switch 24 is connected through line 40 to amplifier 41. Accelerometer 60 is mounted on pitch trunnion 15 by a bracket 63, similar to the switch bracket 29 of FIG. 1, and is shown to have an inertial mass element 64 suspended for longitudinal inertial movement between springs 65 and 66 which are, in turn, mounted at their outer ends 67 and 68 respectively in bracket 63. Drive train 69 interconnects the inertial mass element 64 and tap 62 of potentiometer 61 for advantageously driving the tap and thereby providing a pitch signal through line 40 to the amplifier. Thus, it appears that whenever the gyro 10 drifts away in pitch from the vertical, inertial mass element 64 will shift from its neutral centered position and potentiometer tap 62 will be so driven as to thereby provide an activating signal input to the amplifier for driving erection motor 39 in the proper direction and with appropriate torque for gyro pitch erection.

Pitch indicating accelerometer 60 is, however, just as with the electrolytic switch 24, particularly subject to velocity change accelerations and deaccelerations in the forward direction. It may be readily understood, therefore, that in the embodiment of FIG. 2 a velocity change sensing device may be advantageously employed in the same manner as with the bridge network 32 and for the same reasons as hereinbefore outlined for the embodiment of FIG. 1.

In the embodiment of FIG. 3, elemental portions common to the embodiments of either FIG. 1 or 2 are numbered the same. The portions broken away and not shown may include the pitch sensing gyro erection system of FIG. 1 with an electrolytic switch 24, or instead utilize the accelerometer servo erection sensing and control arrangement of FIG. 2. In either event, schematically represented data sensing apparatus 70 is connected to computer equipment 71 by wiring 72, and a drive train 73 connects computer equipment 71 to movable tap 48 of potentiometer 47 in much the same manner and for the same reasons as drive train 50 connects velocity change indicating bellows 51 to tap 48 in the embodiment of FIG. 1. In such an embodiment the data sensing apparatus 70 may be any of many air speed indicating devices such as windmilling propeller driven devices, force deflection measuring mechanisms, and static fluid impact pressure devices for providing air speed information. In addition, computer equipment 71 may be the autopilot system of an aircraft and derive velocity change from air speed information fed thereto. In another embodiment, that may be considered to be illustrated schematically by FIG. 3, the data sensing apparatus 70 would be radio wave doppler sensing means and the computer equipment 71 would be doppler analyzing means adapted for providing speed information, and particularly a velocity change output through drive train 73.

In the gyro pitch erection system of FIG. 4, portions common to the other embodiments are numbered the same. A main difference with this embodiment from the others is that it employs a pendulum 75, pivotally mounted by pivot pin 76 on aircraft frame member 23a, as a pitch indicating reference device. This embodiment also differs in utilizing a synchro system 77 in cooperation with the pendulum 75 for gyro pitch erection control. With this arrangement A.C. power source 38 feeds A.C. power to synchro 78 and particularly to synchro rotor coil 79 which is fixed to rotate with pitch trunnion 15 through drive train 80 or if desired by being mounted directly on trunnion 15. The rotational position of coil 79 creates a gyro pitch position signal pick-up in the three-phase synchro Y stator 81 which is conveniently fixed to roll gimbal 13 by mounting block 82. The position signal in Y stator 81 is transmitted through lines 83, 84 and 85 and duplicated in Y stator 86 of synchro 87. This, in turn, creates a signal in synchro rotor coil 88 which is fed through lines 40 and 49 and which may be employed for actuating the amplifier 41 for both power output and A.C. power phasing to winding 44 in establishing the direction and the torque output force transmitted through drive train 46 from motor 39 for gyro pitch erection.

In synchro system 77 synchro rotor coil 88 is advantageously mounted on the stem 89 of pendulum 75. In addition, synchro Y stator 86 is advantageously mounted in a rotatable frame 90, the rotation of which is controlled by velocity change indicating bellows 51 of leaking bellows structure 52 through drive train 50 in the same manner that tap 48 of potentiometer 47 is driven in the embodiment of FIG. 1 by drive train 50. In this embodiment, just as with the pitch indicating devices of the other embodiments, pendulum 75 is particularly subject to giving erroneous pitch indications during velocity changes when otherwise its relation is so stabilized by gravity during steady constant velocity motion that it gives a good reference reflected through synchro system 77 for indicating the pitch attitude of gyroscope 10. However, when velocity changes are occurring, synchro Y stator 86 is so driven by drive train 50 and the velocity change indicating bellows 51 as to minimize such velocity change created pendulum reference errors.

Obviously, means for imparting velocity change drive through a drive train, such as drive train 73, in the various embodiments represented by FIG. 3 may be employed in driving the rotatable frame and synchro Y stator 86 of FIG. 4.

Whereas there are illustrated and described preferred constructions which we presently regard as the best modes of carrying out our invention, it should be understood that various changes may be made without departing from the disclosed inventive subject matter particularly pointed out and distinctly claimed hereinbelow.

We claim:

1. In a gyro control system for aircraft having pitch sensing means of the gravity controlled type with signal output means, means for compensating erroneous gyro pitch error signals from said pitch sensing means arising during aircraft velocity change, comprising velocity change sensing leaking bellows having signal output means, gyro pitch erection means, power means for controlling said erection means, said power means being connected to both said signal output means for control of said syro erection means.

2. The gyro control system for aircraft of claim 1, wherein said pitch sensing means comprises an electrolytic switch.

3. The gyro control system for aircraft of claim 1, wherein said pitch sensing means comprises an accelerometer.

4. The gyro control system for aircraft of claim 3, wherein said accelerometer comprises a spring mounted inertial mass.

5. The gyro control system for aircraft of claim 1, wherein said pitch sensing means comprises a pendulum and synchro arrangement.

6. The gyro control system for aircraft of claim 1, wherein said leaking bellows includes a bellows structure contained within a chamber, a forwardly extended tube open at the forward end providing a fluid passage to the interior of said bellows, means providing a bypass passage from said tube to said chamber, and said bypass passage means being adapted for restricted fluid flow.

7. In a gyro control system for aircraft having a pitch sensing potentiometer of the gravity controlled type, means for compensating erroneous gyro pitch error signals from said potentiometer arising during aircraft velocity change, comprising velocity change sensing leaking bellows, a gyro pitch erection motor, electrical power means for driving said motor, an electrical bridge network, reference power input means for said bridge network, said pitch sensing potentiometer being included in said bridge network and being provided with an output tap connected to said electrical power means, a resistance element forming a part of said bridge network being provided with a movable output tap, means connecting the output tap of said resistance element for positioning by said velocity change sensing leaking bellows, and means electrically connecting the output tap of said resistance element to said electrical power means.

References Cited in the file of this patent

UNITED STATES PATENTS

| 2,188,606 | Koster | Jan. 30, 1940 |
| 2,419,063 | Fischer | Apr. 15, 1947 |
| 2,830,160 | Engel et al. | Apr. 8, 1958 |
| 2,868,024 | Meyer | Jan. 13, 1959 |
| 2,968,957 | Condie et al. | Jan. 24, 1961 |
| 3,001,408 | Baring-Gould | Sept. 26, 1961 |

FOREIGN PATENTS

| 948,983 | France | Feb. 7, 1949 |
| 811,036 | Great Britain | Mar. 25, 1959 |